United States Patent
Menz et al.

(10) Patent No.: US 7,952,247 B2
(45) Date of Patent: May 31, 2011

(54) ELECTRICAL MACHINE WITH MAGNETIC BEARING AND SAFETY BEARING

(75) Inventors: Ingo Menz, Berlin (DE); Peter Petereit, Berlin (DE); Günther Siegl, Berlin (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/297,748

(22) PCT Filed: Mar. 15, 2007

(86) PCT No.: PCT/EP2007/052462
§ 371 (c)(1),
(2), (4) Date: Jun. 15, 2009

(87) PCT Pub. No.: WO2007/122044
PCT Pub. Date: Nov. 1, 2007

(65) Prior Publication Data
US 2009/0302698 A1 Dec. 10, 2009

(30) Foreign Application Priority Data
Apr. 18, 2006 (DE) .................. 10 2006 017 933

(51) Int. Cl.
*H02K 7/09* (2006.01)

(52) U.S. Cl. ...................................... 310/90.5
(58) Field of Classification Search .......... 310/90.5, 310/90

See application file for complete search history.

(56) References Cited

U.S. PATENT DOCUMENTS

| | | | | |
|---|---|---|---|---|
| 5,714,818 | A * | 2/1998 | Eakman et al. | 310/90.5 |
| 5,739,609 | A | 4/1998 | Taniguchi | |
| 6,617,733 | B1 * | 9/2003 | Yamauchi et al. | 310/90.5 |
| 2004/0189124 | A1 * | 9/2004 | Baudelocque et al. | 310/90.5 |

FOREIGN PATENT DOCUMENTS

| | | |
|---|---|---|
| EP | 1 083 349 A1 | 3/2001 |
| FR | 1 016 068 A | 4/1950 |
| FR | 2 614 375 A1 | 10/1988 |
| JP | 2004 132513 A | 4/2004 |

* cited by examiner

*Primary Examiner* — Nguyen N Hanh
(74) *Attorney, Agent, or Firm* — Henry M. Feiereisen; Ursula B. Day

(57) ABSTRACT

In case there is a malfunction of the magnetic bearing in an electrical machine, in which such magnetic bearings drive a rotary shaft in a stator (10), a safety bearing (14,14') is provided. According to the present invention, the safety bearing (14,14') exhibits an outer ring (16,16') that is mounted on the stator (10), inside of which a revolving ring (22,22',26) is operated. The safety bearing according to the present invention is particularly suited for machines that have a particularly large and heavy shaft.

10 Claims, 1 Drawing Sheet

ELECTRICAL MACHINE WITH MAGNETIC BEARING AND SAFETY BEARING

BACKGROUND OF THE INVENTION

The invention relates to an electrical machine.

Magnetic bearings are being increasingly used in electrical machines because no friction losses occur on them, as in the case of mechanical bearings. However, magnetic bearings have the disadvantage that disturbances can lead to their failure. (The simplest disturbance situation is a conventional electrical power failure). If the disturbance occurs during operation of the electrical machine, the shaft of the electrical machine is still rotating at high speed when the magnetic bearing fails. It is therefore necessary to provide so-called safety bearings, which hold the shaft in the event of failure of the magnetic bearings, and guide it at least while it is brought to rest, for example during transition from the state in which the shaft is moving to it being brought to rest.

A first approach in the prior art for refinement of the safety bearings was to use essentially conventional roller bearings. In this case, the shaft is guided in the roller bearing with play, in which case it is normally guided by the magnetic bearing, with the roller bearing acting as a safety bearing only when the magnetic bearing fails. Roller bearings are successful, particularly in the case of small electrical machines, in which the shaft is not heavy. Roller bearings have the advantage that the so-called "backward whirl" is suppressed, rotation of the entire shaft in the opposite rotation direction to the rotation applied to it, about its rotation axis.

Roller bearings are not suitable for holding large, heavy rotors: there is only a point or line contact between the roller bodies and the bearing rings, thus resulting in very high surface pressures. These high loads can damage the roller bearings and can block the bearing. In the case of large, heavy shafts, such as those which are used in turbocompressors for feeding gas, dry sliding bearings are nowadays used as safety bearings. Dry sliding bearings essentially comprise a ring which is mounted on the stator and in which the shaft can then rotate in the event of failing of the magnetic bearings. Since the risk of backward whirl rises as the coefficient of friction between the shaft and the safety bearing increases, the aim is to minimize the coefficient of friction by choice of suitable materials for this ring. By way of example, specific bronze alloys are used as friction coatings, but they are subject to severe wear.

The problem of wear in a dry sliding bearing is solved in U.S. Pat. No. 5,739,609 by splitting the ring in two: one ring element is attached to the stator, and a second ring element is mounted in the first ring element. In the event of wear on the inner surface, the second ring element can then be replaced. A sliding means is used in this case in order to make it easier to replace the second ring element. However, during operation the second ring element remains rigid with respect to the first ring element, which is attached to the stator, so that nothing is fundamentally changed with regard to the method of operation as a dry sliding bearing.

SUMMARY OF THE INVENTION

The object of the invention is to provide a safety bearing, in particular for large heavy shafts as well, in which the backward whirl is avoided, and which is not subject to severe wear.

According to the invention, the object is achieved by an electrical machine having a stator and a shaft which can rotate therein and is guided by magnetic bearings, with safety bearings being provided in the event of failure of the magnetic bearings, which safety bearings then hold the shaft and guide it while its movement is being brought to rest, wherein the safety bearing of the electrical machine includes an outer ring which is mounted on the stator in which a rotatable ring is guided in a sliding manner.

If the magnetic bearings fail, the rotatable ring is moved on the basis of the transmission of a force or of a torque from the shaft and then results in the shaft not being able to carry out arbitrary movements in an uncontrolled manner, thus suppressing the backward whirl. The rotatable ring is guided in a sliding manner with little friction. The coefficients of friction of the arrangement are thus low overall. (A rolling friction force is conventionally comparatively small). Since the forces are not transmitted at points or on individual lines but over the entire inner surface and outer surface of the ring, the safety bearing has a high load-bearing capability and is particularly suitable for use of large, heavy shafts.

In a first embodiment, the rotatable ring is an inner ring which surrounds the shaft with radial play. If the magnetic bearings fail, the shaft falls downwards under the influence of gravity, then makes contact in the lower area of the inner ring and can accordingly transmit forces and torques.

In an alternative embodiment, the rotatable ring is an intermediate ring. The intermediate ring surrounds a further ring, which is guided in it in a sliding manner. However, in this case, this may be an intermediate ring or directly an inner ring which surrounds the shaft with radial play. The use of one or more intermediate rings has the advantage that, in the event of a fault of the sliding guide, a further option for sliding guidance still remains (in the example between the inner ring and the intermediate ring) at an intermediate point (for example between the intermediate ring and the outer ring).

In one preferred embodiment, the sliding guide has little friction, to be precise in that a sliding means is inserted between the rings, or the rings are provided with a sliding layer. In the latter case, it is sufficient to provide the inside of the outer ring and the outside of the inner ring, and possibly the intermediate ring, internally and externally, with a sliding layer. By way of example, a layer such as this may be composed Teflon or a specific electric chemical coating. In the case of the other alternatives, conventional grease or graphite can be used as the sliding means.

In a further preferred embodiment, the outer ring has a U-shaped profile. One limb of the "U" is in this case removable. In other words, the limb of the U-profile is formed by a removable annular web. The capability to remove it is necessary in order that the inner ring and possibly the intermediate ring can be introduced into the U-shaped profile. The U-shaped profile makes it possible in particular to introduce a sliding means, but may also be worthwhile when using the sliding layer as mentioned above because, in any case, this prevents the inner ring and/or the intermediate ring from being axially torn out with its limbs (and thus also for example tilting of the inner ring). The angle between the two limbs of the "U" in the U-profile on the base of the "U" need not necessarily be 90° in this case, but the limbs can also, for example, be opened somewhat wider in order in this way to provide an opening angle of 100° to 110°.

BRIEF DESCRIPTION OF THE DRAWING

One preferred embodiment of the invention is described in the following text with reference to the drawing, in which.

DETAILED DESCRIPTION OF PREFERRED EMBODIMENTS

Figure 1A:
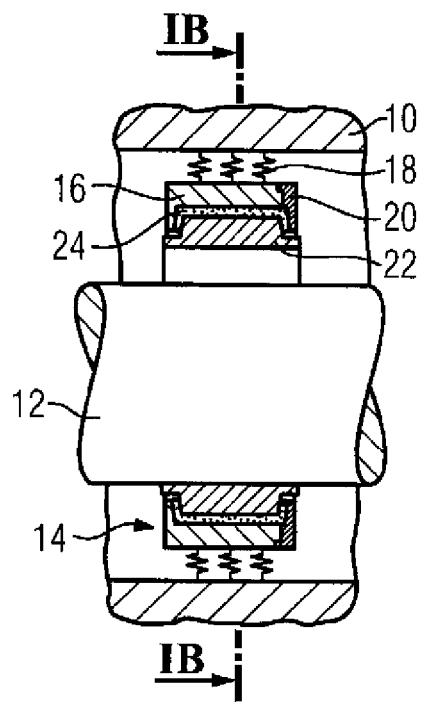
FIG. 1A shows, schematically, a side section view of a first embodiment of the invention.
Figure 1B:
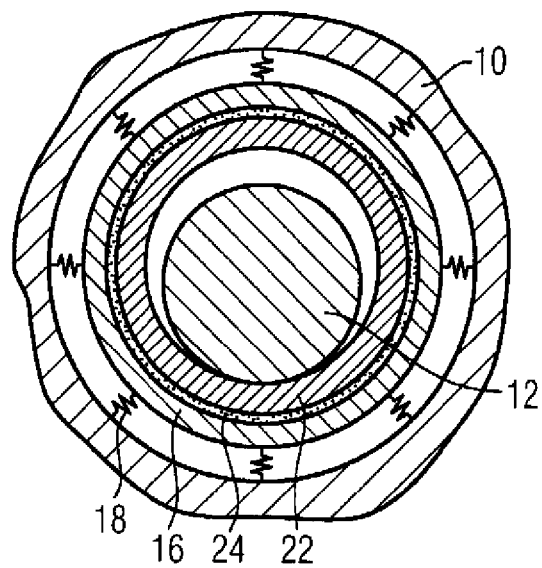
FIG. 1B shows, schematically, a section view at right angles to the section view shown in FIG. 1 A, FIG. 2 A shows, schematically, a side section view of a second embodiment of the invention, FIG. 2 B shows, schematically, a section view at right angles to the section view shown in FIG. 2 A.
Figure 2A:
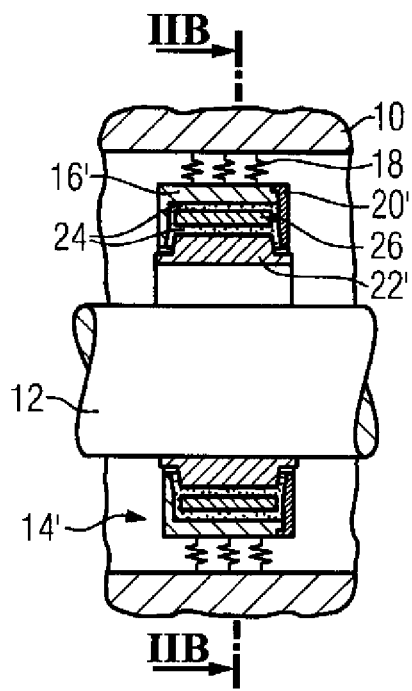

An electrical machine according to the invention comprises a stator 10, which is indicated schematically in the FIGS. 1A 1B, 2A, 2B, and a shaft 12 which can rotate therein and only parts of which are illustrated. During operation, the shaft 12 is guided via magnetic bearings, (which are not shown). The invention relates to a safety bearing which is used when the magnetic bearing fails. The safety bearing then holds the shaft. The FIGS, 1A, 1B, 2A, 2B illustrate the shaft 12 in the situation in which the magnetic bearings have failed, and in which the shaft has fallen downwards by gravity. It then acts as a safety bearing, which is annotated in its entirety by 14. The safety bearing has an outer ring 16 which is mounted on the stator 10 via spring and damper elements 18 which are indicated only schematically in the FIGS. The outer ring 16 has a U-shaped profile. One limb of the U-shaped profile which is identified by emphasized shading and is annotated with 20 in FIG. 1A and with 20' in FIG. 2A, is removable and thus allows a further ring to be introduced into the outer ring 16.

In the case of a first embodiment, which is illustrated in FIG. 1A and FIG. 1B, an inner ring 22 is arranged directly in the outer ring 16. A sliding means 24, for example conventional grease, is located between the outer ring 16 and the inner ring 22. Instead of a sliding means 24, it is also possible to provide a sliding layer, for example composed of Teflon, both on an inner surface of the outer ring 16 and on an outer surface of the inner ring 22. In the present case, the inner ring 22 is shown as having a T-shaped profile with one foot of the "T" (not annotated specifically) pointing outwards and engaging between the two limbs of the U-profile of the outer ring 16. This engagement is, of course, made possible only by the fact that the inner ring is inserted in advance with the ring 20 removed, in which case the ring 20 was then subsequently reattached to the remaining outer ring 16.

As can be seen in particular in FIG. 1B, the shaft 12 falls directly on the inner ring 22, if the magnetic bearings fail. The shaft, which can then be grasped while rotating transmits a torque to the inner ring 22, which then rotates on the principle of action and reaction, such that the overall arrangement is kept as stable as possible. This largely prevents uncontrolled movements of the shaft 12. The task of the spring elements 18 is to reduce the initial shock force.

Figure 2B:
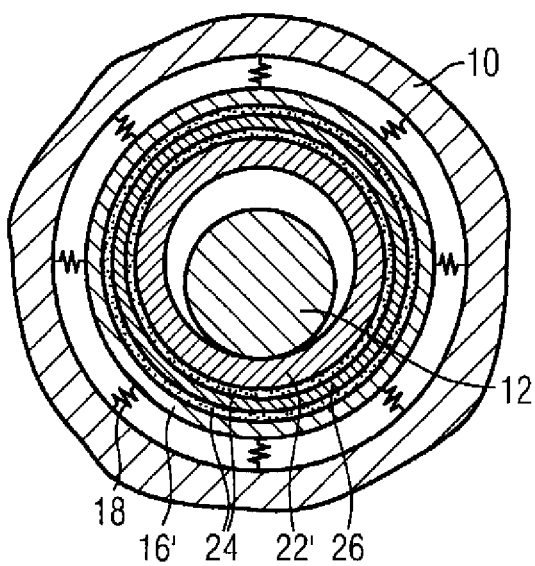

In one alternative embodiment, which is illustrated in FIGS. 2A and 2B, an intermediate ring 26 is initially arranged in the U-shaped profile of the outer ring 16' and is guided in a sliding manner by means of a sliding means 24 in the outer ring 16'. The intermediate ring 26 surrounds an inner ring 22', which is likewise guided in a sliding manner, to be precise in the inner ring 26. (A sliding guide can also be provided in addition with respect to the limbs of the outer ring 16', in which case, in comparison to the embodiment illustrated in FIG. 2A, the sliding means 24 would then need to be introduced somewhat further out as well, between the outer ring 16' and the inner ring 22').

As can be seen in FIG. 2B, in this case as well, the shaft 12 falls on the inner ring 22' and transmits a torque to it. This now rotates with respect to the inner ring 26. It is now also possible for the inner ring 26 itself to rotate with respect to the outer ring 16'. The situation in which the sliding guidance between the inner ring 22' and the intermediate ring 26 is faulty, this leads (virtually) exclusively to rotation between the intermediate ring 26 and the outer ring 16', in which case the relative movement between the inner ring 22' and the intermediate ring 26 is then suppressed.

The embodiment shown in FIGS. 1A/1B and FIGS. 2A/2B have the common feature that the forces act in a distributed manner over an entire ring, as a result of which there are no pressure points as in the case of roller bearings. In comparison conventional dry bearings, as a result of the fact that rolling movements are introduced, this means that the main contribution to the coefficient of friction is the rolling resistance, which greatly reduces the friction. The inner ring 22/22' is therefore subject only to a small amount of wear.

What is claimed is:

1. An electrical machine, comprising:
   a stator;
   a shaft rotatably received in the stator;
   a magnetic bearing assembly guiding the shaft; and
   a safety bearing assembly responsive in the event of a failure of the magnetic bearing assembly by holding and guiding the shaft as the shaft moves to a standstill, said safety bearing assembly comprising an outer ring which is mounted on the stator via a spring or damper assembly and has a U-shaped profile to define a base and two limbs extending from the base, wherein one of the limbs of the U-shaped outer ring is formed by a removable annular web, said safety bearing assembly comprising a rotatable ring which is guided in the spring or damper assembly in a sliding manner,
   wherein the rotatable ring is comprised of an intermediate ring and an inner ring which surrounds the shaft and is guided in the intermediate ring in a sliding manner.

2. The electrical machine of claim 1, wherein each the two limbs of the U-shaped outer ring defines with the base an opening angle which is 90°.

3. The electrical machine of claim 1, wherein each of the two limbs of the U-shaped outer ring defines with the base an opening angle which ranges from 100° to 110°.

4. The electrical machine of claim 1, further comprising a sliding agent provided between the limbs of the outer ring and the inner ring.

5. An electrical machine, comprising:
   a stator;
   a shaft rotatably received in the stator;
   a magnetic bearing assembly guiding the shaft;
   a safety bearing assembly responsive in the event of a failure of the magnetic bearing assembly by holding and guiding the shaft as the shaft moves to a standstill, said safety bearing assembly comprising an outer ring which is mounted on the stator via a spring or damper assembly and has a U-shaped profile to define a base and two limbs extending from the base, wherein one of the limbs of the U-shaped outer ring is formed by a removable annular web, said safety bearing assembly comprising a rotatable ring which is guided in the spring or damper assembly in a sliding manner; and
   a sliding agent introduced between the outer and rotatable rings.

6. The electrical machine of claim 5, wherein each the two limbs of the U-shaped outer ring defines with the base an opening angle which is 90°.

7. The electrical machine of claim 5, wherein each of the two limbs of the U-shaped outer ring defines with the base an opening angle which ranges from 100° to 110°.

8. An electrical machine, comprising:

a stator;

a shaft rotatably received in the stator;

a magnetic bearing assembly guiding the shaft; and a safety bearing assembly responsive in the event of a failure of the magnetic bearing assembly by holding and guiding the shaft as the shaft moves to a standstill, said safety bearing assembly comprising an outer ring which is mounted on the stator via a spring or damper assembly and has a U-shaped profile to define a base and two limbs extending from the base, wherein one of the limbs of the U-shaped outer ring is formed by a removable annular web, said safety bearing assembly comprising a rotatable ring which is guided in the spring or damper assembly in a sliding manner, wherein the outer and rotatable rings are provided with a sliding layer.

9. The electrical machine of claim 8, wherein each the two limbs of the U-shaped outer ring defines with the base an opening angle which is 90°.

10. The electrical machine of claim 8, wherein each of the two limbs of the U-shaped outer ring defines with the base an opening angle which ranges from 100° to 110°.

* * * * *

UNITED STATES PATENT AND TRADEMARK OFFICE
CERTIFICATE OF CORRECTION

| | | |
|---|---|---|
| PATENT NO. | : 7,952,247 B2 | |
| APPLICATION NO. | : 12/297748 | |
| DATED | : May 31, 2011 | |
| INVENTOR(S) | : Ingo Menz, Peter Petereit and Günther Siegel | |

It is certified that error appears in the above-identified patent and that said Letters Patent is hereby corrected as shown below:

Column 4, line 36, claim 2: after "wherein each" insert --of--;

Column 6, line 6, claim 9: after "wherein each" insert --of--.

Signed and Sealed this

Twenty-fifth Day of October, 2011

David J. Kappos
*Director of the United States Patent and Trademark Office*